United States Patent
Dufrene

(10) Patent No.: US 11,714,400 B2
(45) Date of Patent: Aug. 1, 2023

(54) METHOD FOR VALIDATING AN ETHERNET CONFIGURATION OF AN AUTOMATION SYSTEM

(71) Applicant: Schneider Electric Industries SAS, Rueil Malmaison (FR)

(72) Inventor: Pierre Dufrene, Nice (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 112 days.

(21) Appl. No.: 17/483,881

(22) Filed: Sep. 24, 2021

(65) Prior Publication Data

US 2022/0100183 A1 Mar. 31, 2022

(30) Foreign Application Priority Data

Sep. 30, 2020 (EP) .................................... 20306123

(51) Int. Cl.
*G05B 19/418* (2006.01)

(52) U.S. Cl.
CPC . *G05B 19/41885* (2013.01); *G05B 19/41855* (2013.01)

(58) Field of Classification Search
None
See application file for complete search history.

(56) References Cited

U.S. PATENT DOCUMENTS

2016/0057733 A1 2/2016 Grandillo et al.

FOREIGN PATENT DOCUMENTS

EP 2637357 A1 9/2013
WO 2018222428 A1 12/2018

OTHER PUBLICATIONS

Odva, "Common Industrial Protocol (CIP) and the Family of CIP Networks", Feb. 29, 2016, Retrieved from the Internet: URL: https://www.odva.org/Portals/0/Library/Publications_Numbered/PUB00123R1_Common-Industrial_Protocol_and_Family_of_CIP_Networks.pdf, retrieved on Oct. 16, 2017, pp. 1-134.
Andreev, Anton et al., "A Graph Model of the Topology of Physical, Link and Network Layers of an Enterprise Network", Proceedings of the 19th Conference of FRUCT Association, Nov. 7, 2016, 8 pages.
European Search Report and Search Opinion dated Mar. 16, 2021 for corresponding European Patent Application No. EP20306123.9, 15 pages.

*Primary Examiner* — Carlos R Ortiz Rodriguez
(74) *Attorney, Agent, or Firm* — Locke Lord LLP

(57) ABSTRACT

A method for validating an Ethernet configuration of an automation system including several industrial devices, the method includes obtaining a device identifier for each of the industrial devices and indications of device ports and of device port connections. The method further includes obtaining device Ethernet parameters and instantiating a system object model of the Ethernet configuration of the automation system based on the device identifiers, the device ports and device port connections and the Ethernet parameters. The system object model allows applying predefined rules for generating a graph model representative of the Ethernet configuration. To the generated graph model cycle detection as known from graph theory may be applied by means of depth-first search. Based on the outcome of the cycle detection a validation result may be indicated. A generic Ethernet object model and a topology manager also are disclosed.

10 Claims, 7 Drawing Sheets

METHOD FOR VALIDATING AN ETHERNET CONFIGURATION OF AN AUTOMATION SYSTEM

BACKGROUND

The present invention relates to industrial automation systems interconnecting several components such as automation devices, and in particular to a method for detecting of communication configuration issues within such an industrial automation system. Such a method may be implemented through an engineering tool which is used during the initial design phase or later update or upgrade of an automation system.

Ethernet is a layer 2 protocol that may be used between industrial devices that are wire-connected, like for example in a factory. These industrial devices may involve controllers such as Programmable Logic Controllers PLCs, drives, Human Machine Interfaces, HMI, and networking devices such as routers and switches for example.

An Ethernet configuration of a system corresponds to the way the industrial devices are interconnected via their Ethernet ports and depends on Ethernet parameters of the industrial devices.

In general, an Operational Technology (OT) engineer may be in charge of the design of industrial systems and the creation thereof by interconnecting the various devices. Once connected, the devices making up the industrial system need to be programmed and configured. Thereto, dedicated programming tools, such as e.g. EcoStruxure Control Expert or EcoStruxure Machine Expert from Schneider Electric, may be used. Such tools are capable to detect and identify connected devices within the Industrial System via a discovery process or similar method. For the identified devices pre-arranged models may be selected from one or more catalogues, including suggested basic industrial configurations which may be modified using the programming tools.

Apart from programming and configuring each device to perform its' industrial function, also the communication between these devices needs to be configured. Accordingly, to ensure proper communication, it is also necessary to ensure that the Ethernet configuration of the industrial system is correct.

However, the OT engineer's knowledge in terms of Information Technology (IT) may be limited. Hence, IT tools may generally be used to evaluate the Ethernet configuration, once the industrial system is created. In turn, also an Ethernet configuration plan may be provided by an IT engineer in advance which is then implemented by the OT engineer. However, implementation of the Ethernet configuration plan may still need to be verified.

In addition, if some Ethernet parameters of an industrial device are modified, the Ethernet configuration may need to be evaluated or verified again. This leads to a loss of efficiency when designing industrial systems involving the Ethernet protocol.

SUMMARY OF INVENTION

It is an object of the invention to alleviate at least some of the disadvantages mentioned above.

In a first aspect of the invention a method for validating an Ethernet configuration of an automation system comprising several industrial devices. The method including obtaining a device identifier for each industrial device and indications of device ports and device port connections between ports of the industrial devices, and obtaining device Ethernet parameters applied for each of the industrial devices. The method further including instantiating a system object model of the Ethernet configuration of the automation system based on the device identifiers, the device ports, device port connections and the device Ethernet parameters and generating a graph model representative of the Ethernet configuration from the system object model by applying a set of predefined rules. Applying cycle detection to the generated graph mode by means of depth-first search and indicating a validation result based on the outcome of cycle detection.

In another aspect, the invention relates to a generic Ethernet Object model, the generic Ethernet Object model including at least one of the following classes: an Ethernet class, a Switch Capability class, a Routing Capability class, a Ports class, an IP Range class, an End point class, an interface class, and/or a Broadcast domain class.

In yet another aspect, the invention relates to a topology manager configured for generating a graph model of an automation system wherein industrial devices are each represented by an instance of the generic Ethernet Object model. The topology manager further being configured for applying cycle detection by means of a depth first search according to graph theory.

The method as disclosed facilitates automation of validating various Ethernet functionalities required by an automation system, such as Loop detection, communication, data flow evaluation, Logical connection, and broadcasting domain. A further purpose for validation may relate predictive analysis of communication between new devices added to the automation system.

The method as disclosed may be implemented on a computer system. In addition, the invention may relate to a computer program executable by a processor and comprising instructions for, when executed by the processor, carrying out the steps of the method as disclosed. Furthermore, the invention may relate to a non-transitory computer readable medium, with a computer program stored thereon, said computer program comprising instructions for, when executed by a processor, carrying out the steps of the method as disclosed.

Further objects, aspects, effects and details of the invention are described in the following detailed description of number of exemplary embodiments, with reference to the drawings.

BRIEF DESCRIPTION OF DRAWINGS

By way of example only, the embodiments of the present disclosure will be described with reference to the accompanying drawings, wherein.

DETAILED DESCRIPTION

Figure 1:
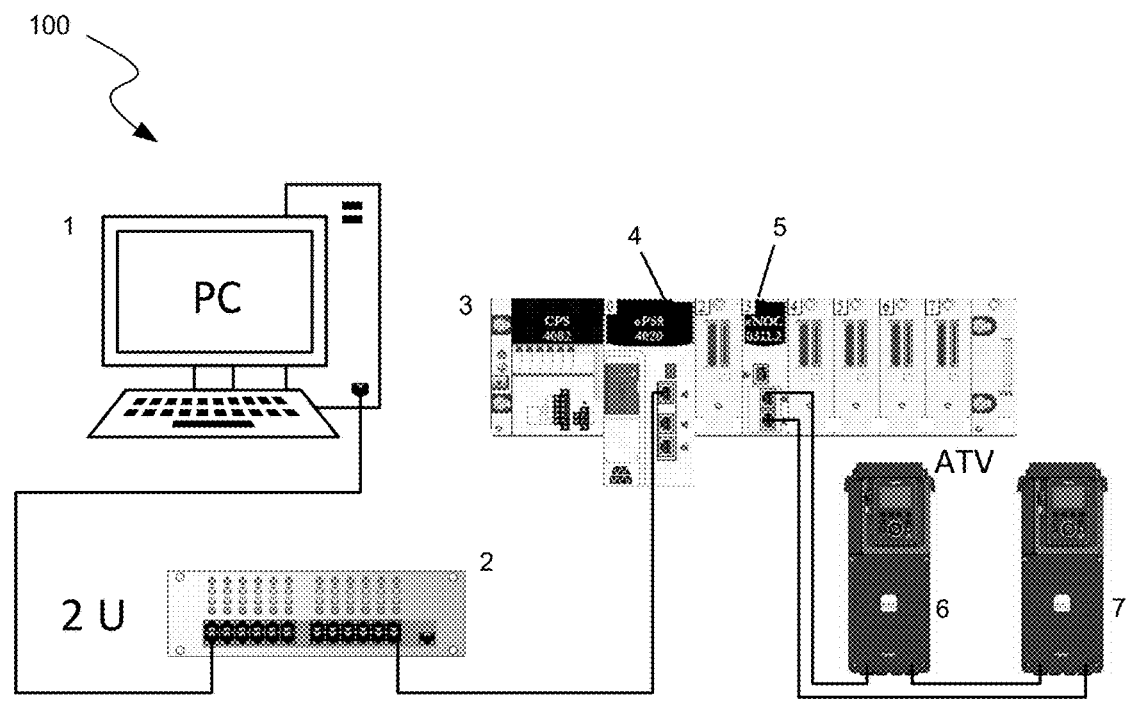
FIG. 1 illustrates an example of an industrial system with Ethernet communication network.

Referring to FIG. 1, an example of an industrial system 100 is shown. A computer PC 1 is connected via a router 2 to a Modicon M580 processing unit 4 installed in a slot of an Ethernet I/O backplane 3. Mounted in another slot of the Ethernet I/O backplane 3 is an NOC 311 Ethernet module 5 to which two Altivar speed drives 6, 7 are connected. The speed drives 6, 7 are also connected to one another.

Figure 2:
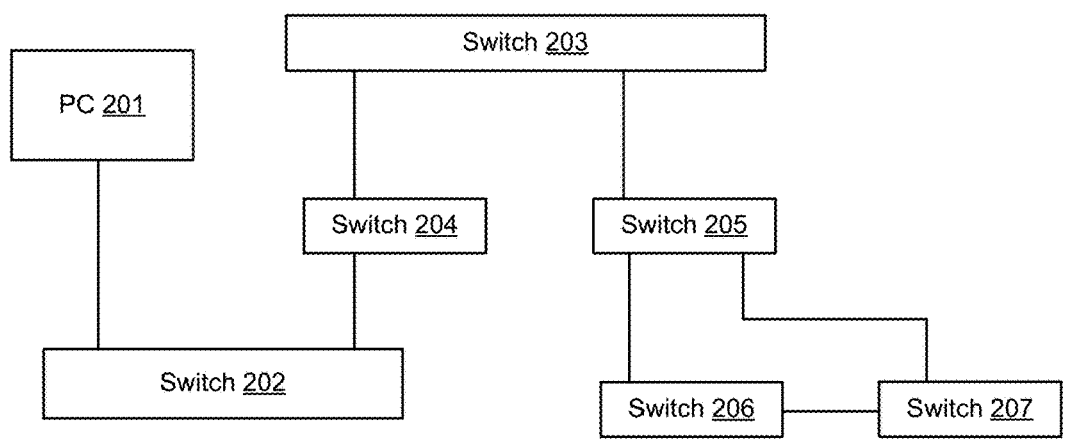
FIG. 2 shows a configuration model of the industrial system of FIG. 1.

Referring to FIG. 2, a basic model of the industrial system 100 of FIG. 1 is shown. The various components may be represented i.e. modelled as switches. The PC 1 is represented as PC 201. The router 2 is modelled as switch 202, the Ethernet backplane 3 is modelled as switch 203, the processing unit 4 is modelled as switch 204, the Ethernet module is modeled as switch 205, and the speed drives 6, 7 are modelled as switches 206 and 207. The PC The model of FIG. 2 may be presented in an OT configuration tool i.e. engineering tool which may actually be executed on the PC 1 of FIG. 1. The models of the various components may be picked from catalogues or libraries available in the engineering tool. These models will include representations of the communication circuitry of each component. Which representations may be used to create graphs.

Figure 3:
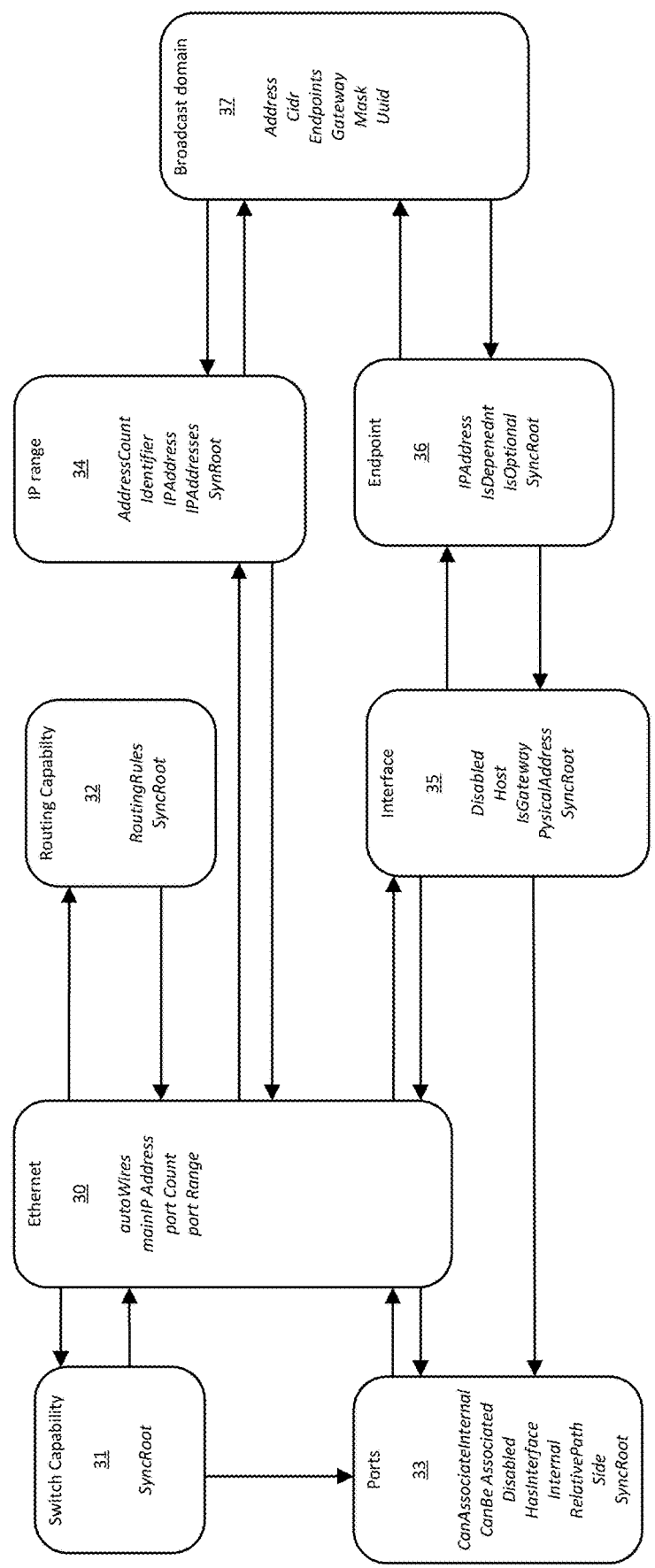
FIG. 3 is an example of a generic Ethernet object model.

Shown in FIG. 3 is an example of a generic Ethernet Object Model. The object model includes various classes, which each define particular Ethernet characteristics of a piece of industrial equipment. When a user of the engineering tool designs a system and declares various devices as being part of the system, for each device an instance of a class Equipment is created to which an instance of the generic model Ethernet Object is linked. Depending on the type of device, different classes of the Object model are instantiated. With each type of device, a number of predetermined classes is associated, as available from libraries in the engineering tool. When the associated classes are instantiated and parameter settings are defined, these class instances describe together, the overall Ethernet behavior of a piece of industrial equipment, in terms of e.g. communication, security and configuration capabilities.

The generic Ethernet object model may include a central Ethernet class 30, a Switch Capability class 31, a Routing Capability class 32, a Ports class 33 and an IP Range class 34. The generic Ethernet object model may further include an End point class 36, an interface class 35 and/or a Broadcast domain class 37. Parameters for the Switch Capability class 31 may be defined by obtaining settings directly from a library available in the Engineering tool. Similarly, parameters of the Routing Capability class 32 may be defined by obtaining settings from another available library. The Ports class 33 and the IP Range class 34 may obtain settings for their respective parameters from further classes. In the graphic representation of the Object model, arrows may indicate that one class has knowledge that another class is present.

An instance of the Ethernet class 30 defines for each particular type of device which further classes make up the device, such as port, interface, switch capability classes.

One or more instances of the ports class 33 represent the physical ports of the device. For each port instance properties like, Name, Enabled/Disabled are defined.

An instance of the IP range class 34 represents a range of reserved IP address associated with devices which are not part modelized by an instance of the generic ethernet Object Model.

An instance of the Endpoint class 36 defines an IP address, which will belong to an interface instance, and may be associated with a Broadcast domain.

An instance of the interface class 35 represents the network interface of a device. It defines properties like, Name, Enabled/Disabled, Physical address, a collection of endpoints, and a collection of associated physical ports.

An instance of the Switch capability class 31 represents the type and number of physical ports present. It further holds information on what ethernet frames can be forwarded from one port to another one over the data link layer, i.e. layer 2 of OSI model, based on MAC addresses.

An instance of the Routing capability instance 32 represents the type and number of interfaces. It further holds information on what ethernet frames can be transmitted from one network to another one, using routes defined inside this routing capability, based on the interfaces. This reflects the network layer, i.e. layer 3 of OSI model.

An instance of the Broadcast domain class 37 defines the logical division of the network. It determines which nodes within the network may be communicated with by broadcast.

Figure 4:
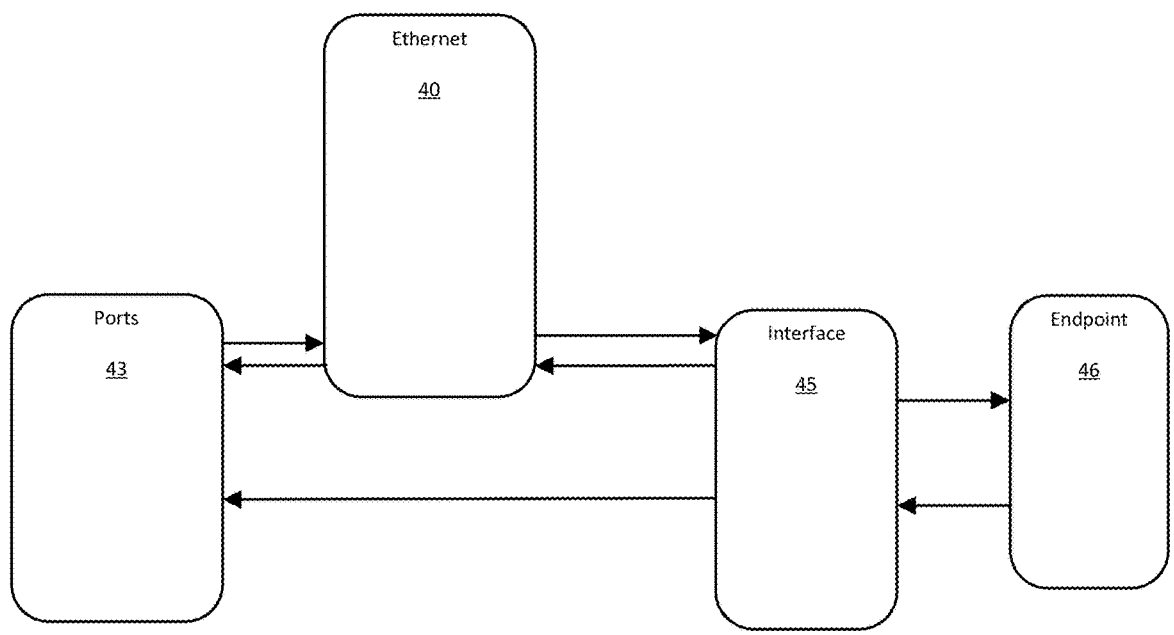
FIG. 4 is an example of a resulting Object model for a PC.

As an example of a device and its' associated Object model, a user may declare a PC with a single Ethernet-card as part of his system. The resulting Object model, as shown in FIG. 4, will include one Port instance 43, one Ethernet instance 40, one interface instance 45, and one Endpoint instance 46.

Figure 5:
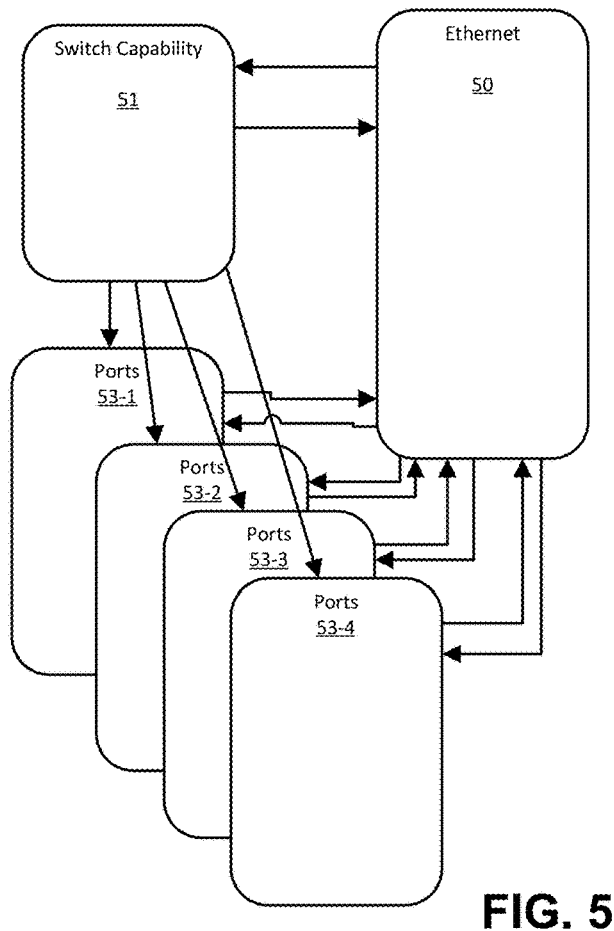
FIG. 5 is an example of a resulting Object model for a four port non-managed switch.

As another example of a device and its' associated Object model, a user may declare a non-managed switch with four ports as part of his system. The resulting Object model, as shown in FIG. 5, will include one Switch capability instance 51, four Port instances 53-1, 53-2, 53-3 and, 53-4, and one Ethernet instance 50. Such a non-managed switch does not have an interface or an Endpoint.

Figure 6:
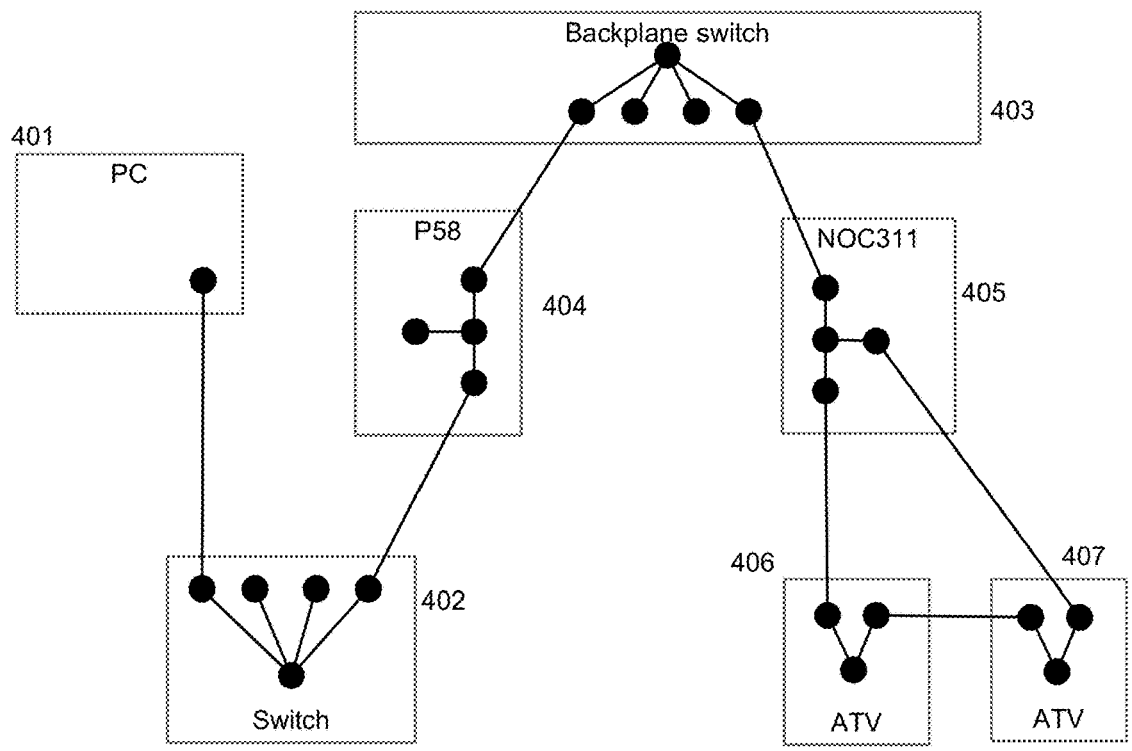
FIG. 6 is an example of graph generated from the configuration model of FIG. 2.

Referring to FIG. 6, an example of a graph generated from the configuration model of FIG. 2 is shown. Such a graph may be generated for any industrial system by identifying the various components within the network and representing each component by an instance of the generic Ethernet Object model illustrated in FIG. 3. From the representation of the generated graph shown in FIG. 6, it may already be easily to visually identify if a loop is present. The automated detection of such a loop is possible by applying a set of rules to the Object model of the industrial system based on the generic Ethernet Object Model to generate a graph, For Loop detection, the information required concerns the ports present in the devices, the wire connections present between these ports and the switch capability instances, the latter meaning the capability of switching connectivity from one port to another port.

A Topology Manager, which may be part of the engineering tool, may create instances for each component of the industrial network of FIG. 1 based on the generic Ethernet Object Model of FIG. 3. For example, for PC 1 one instance PC 401 is generated having one port only. For 2U switch router 2, one instance switch 402 is generated having one Switch Capability and four Ports switched by it. For Ethernet I/O backplane 3, one switch instance 403 is generated having one Switch Capability and four Ports, one port for a CPU slot and three ports for module slots.

For the Modicon M580 processing unit 4, one instance 404 is generated having one (CPU) port, connected by a wire connection to an Internal Port, and a Switch Capability for the four ports switched by it, which includes the internal port. For the NOC 311 Ethernet module 5, one instance 405 is generated having one port, connected by a wire connection to an Internal Port, and a Switch Capability for all four ports switched by it. For each of the Altivar speed drives 6 and 7, respective instances 406, 407 are generated, each having one Switch Capability with two Ports switched thereby.

In order for the Topology Manager to generate the graph, it creates for each port a Vertex and for each wire connection an Edge. Secondly, for each Switch Capability a Vertex is created and each Port switched by it gets connected thereto by one Edge. Hence, using these rules, the graph of FIG. 6 may be generated directly from the configuration model of FIG. 2.

Figure 7:
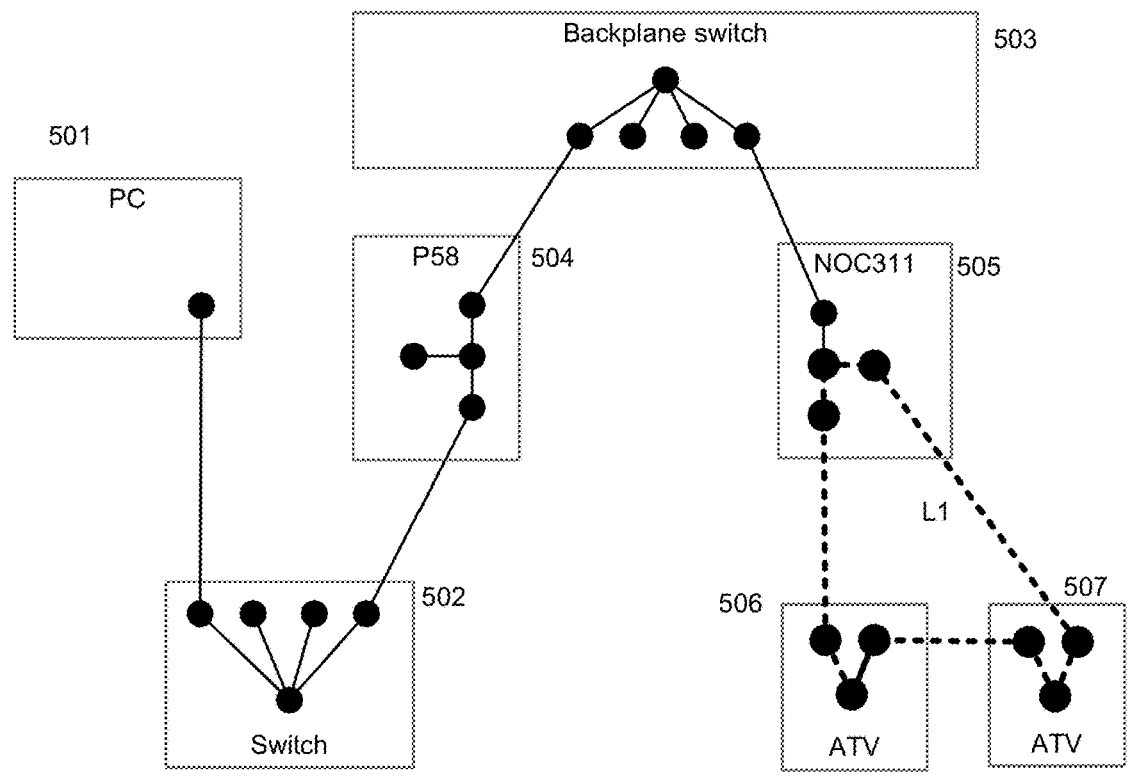
FIG. 7 illustrates loop detection within the graph of FIG. 4.

By applying Graph Theory as known in the art, Loop detection is enabled by means of the generated graph. A loop L1 as indicated in FIG. 7, may accordingly be detected and the design engineer may be alerted of the existence of such a loop in the current design of the industrial system.

In graph theory, a cycle i.e. loop in a graph is a non-empty trail in which the only repeated vertices are the first and last vertices. A directed cycle in a directed graph is a non-empty directed trail in which the only repeated vertices are the first and last vertices.

The existence of a cycle in directed and undirected graphs can be determined by whether depth-first search (DFS) finds an edge that points to an ancestor of the current vertex, meaning if it contains a back edge. All the back edges which DFS skips over are part of cycles. In an undirected graph, the edge to the parent of a node should not be counted as a back edge, but finding any other already visited vertex will indicate a back edge. In the case of undirected graphs, only O(n) time is required to find a cycle in an n-vertex graph, since at most n−1 edges can be tree edges.

Figure 8:
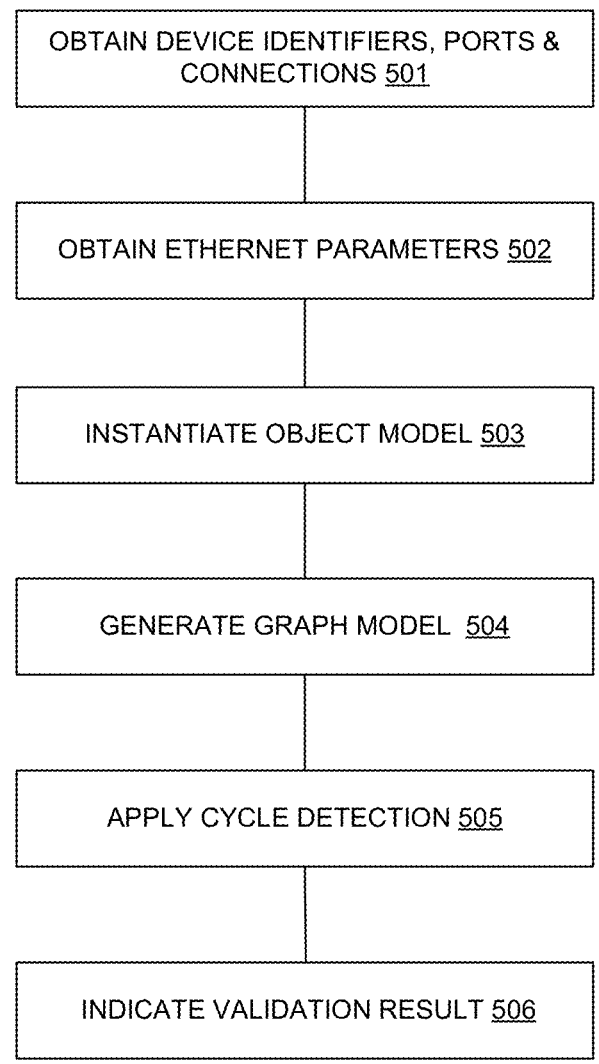
FIG. 8 is a flowchart of a method according to an embodiment of the invention.

Referring to FIG. 8, a flowchart of a method for validating an Ethernet configuration of an automation system is shown. The method may be executed by an engineering tool during an engineering phase of designing an automation system. The method includes obtaining 501 identifiers of industrial devices and indications of device ports and of device port connections between ports of the industrial devices. These may be obtained from the tool where they have been entered or declared by the user of the engineering tool. Or they may be readily available from catalogs or libraries. The method further includes obtaining 502 Ethernet parameters for each respective industrial device. These parameters may in turn be obtained from libraries available in the engineering tool or may be provided by the user during an engineering phase.

The method proceeds with instantiating 503 a system object model of the Ethernet configuration of the automation system based on the device identifiers, the device ports and the device port connections and the set of Ethernet parameters that were obtained as described above. From the system object model a graph model may be generated 504 that is representative of the Ethernet configuration of the automation system by applying a set of predefined rules. The set predefined rules may be different depending on the desired validation. There may be a set of predefined rules for loop detection or other types of errors. There may be another set of predefined rules for physical path detection, in order to verify whether communication between certain devices is possible. Or e.g. whether a firewall present in a router is correctly configured. Yet another set of predefined rules may apply for detecting a logical network, for example in order to verify which ports belong to the same logical network.

With the graph model created, the method proceeds by applying cycle detection 505 to the generated graph model by means of depth-first search. Based on the outcome of the cycle detection that is applied, a validation result may be indicated. The result may indicate for example a looping error, presence or absence of a physical connection, or ports being part of a logical network.

Figure 9:
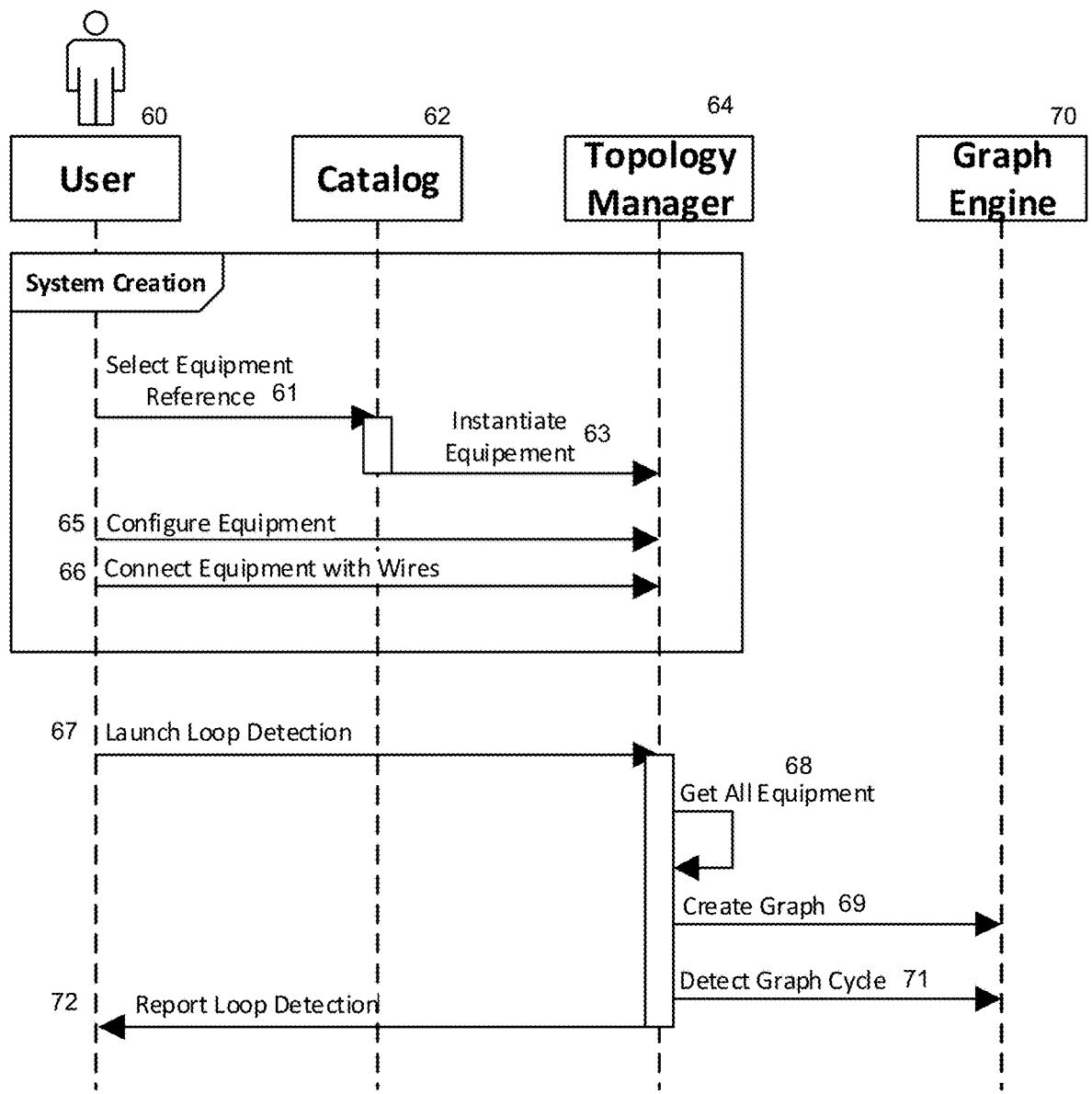
FIG. 9 is a diagram showing the operations of a method according to an embodiment of the invention.

Referring to FIG. 9, a flow diagram illustrating the overall process is shown. An automation system designer 60 may use an engineering tool during a design phase. The user 60 will select equipment that will make up an automation system from a catalog or other software library 62. For the selected equipment 61, data with regard to Ethernet configuration settings and further parameters may be also be obtained from a catalog database 62. The selected equipment will be instantiated 63 with topology manager 64. The instantiated equipment may be further configured 65 by the user. The user may further define the wired connections 66 between the various devices and equipment.

With the automation system designed as explained above, the user may launch a function for validating the Ethernet Configuration, as e.g. loop detection. Upon the launch of the validating function, the engineering tool will perform the method as described in detail above. In short, the topology manager 64 will obtain all the devices from the tool, including all device identifiers and indicated device ports and device port connections. Using the object model for each identified device as described above, a graph model 69 will be created by applying a predefined rule set associated with desired validation, in this example the loop detection. In this embodiment, a dedicated graph engine 70 is provided as part of the engineering tool which will generate the required graph model. With the graph model generated, the graph engine will perform cycle detection, as known from general graph theory, may be applied by executing a depth-first search. Thus, in this example, loop detection 71 is performed by detecting a graph cycle. Other calculations familiar to graph theory may be implemented and be applied for validating the Ethernet Configuration.

Based on the result of the graph cycle detection, the topology manager 64 will report whether a loop was detected or not. And accordingly, if an error is detected in the Ethernet configuration, an alert may be issued.

Next to loop detection, also other ethernet configuration properties may be validated. For example, referring to FIG. 10, a graph is shown which allows to verify whether a OSI Layer 3 communication path between two devices is possible. Where for the loop detection only ports, wire connections and switch capability are considered, for generating a graph representing a Layer 3 communication path also the routing capability, Interfaces and Endpoints are taken in consideration when generating the graph.

Figure 10:
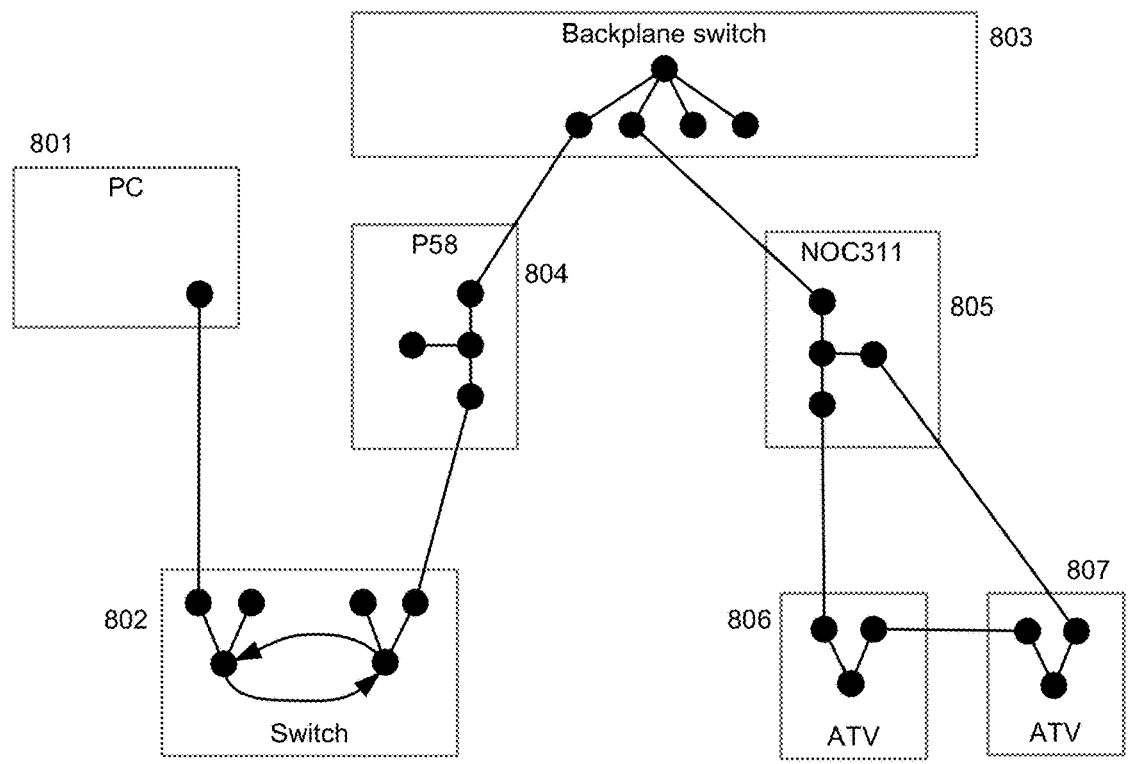
FIG. 10 is another example of a graph generated from the configuration model of FIG. 2.

In this example, to validate the availability between the devices PC 801 and Altivar speed drive 806, the Topology Manager creates for each port a Vertex and for each wire connection an Edge. Secondly, for the Routing Capability 802 a Vertex is created for each port and the configured routes connecting the ports within the router are represented by directed Edges. Also for each interface and for each endpoint associated with such interface respective vertices are created. Edges are created between the vertex of each interface and the vertices of each endpoint associated with that interface. Hence, using these rules, a directed graph as shown in FIG. 10 may be generated directly from the generic Object model of FIG. 3.

Should the router further include a firewall containing certain firewall rules, the directed graph may be adapted accordingly. For example, if the PC 801 would need to communicate with a Modbus server running on the ATV, e.g. running on port 502.

Figure 11:
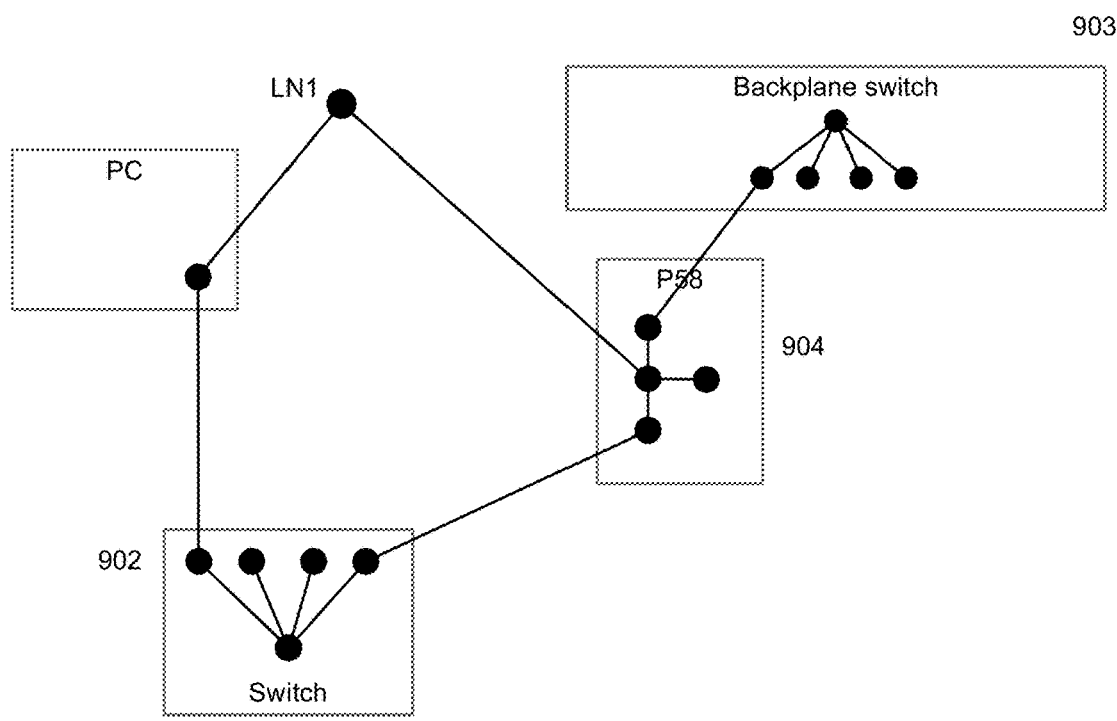
FIG. 11 is yet another example of a graph generated from the configuration model of FIG. 2.

As another example, referring to FIG. 11, a graph is shown which allows to verify which ports belong to a certain broadcast domain i.e. which ports belong to the same Logical Network. For generating such a graph, the data relating to ports, switch capability, Interface, Endpoint and broadcast domain are taken in consideration. The same rules for creating vertices and edges as described in the above examples are used for creation of a graph. In addition, a vertex is created for each broadcast domain and edges are created between the broadcast domain vertex and each endpoint having an IP-address that belongs to that broadcast domain. Hence, using such rules, a graph as shown in FIG. 11 may be generated directly from the generic Object model of FIG. 3.

In this example, the PC 901 is configured to belong to Logical Network 1 (192.168.1.0/24) with IP address 192.168.1.1. The CPU 904 of the P58 belongs to same Logical Network 1 with IP address 192.168.1.2. In order to verify whether the simple switch 2U belongs to the same Logical Network, the Topology Manager creates a Vertex for each port and Edges for each wire connecting the ports. Secondly, a vertex LN1 for the Logical Network 1 is created and the vertices of ports which have an IP-address that is part of the Logical Network 1 are connected with an Edge to the vertex LN1 of the Logical Network 1. Starting from the vertex LN1 it can be assessed using graph theory which other physical ports belong to the same logical network. Hence, using these rules, the graph of FIG. 11 may be generated directly using the generic Object model of FIG. 3.

Similarly, for the purpose of cybersecurity, it could be assessed whether one device is connected to an outside network and in turn which further devices are connected to that one device. Consequently, mitigating measures such as configuring a firewall may be proposed.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A computer implemented method for validating an Ethernet configuration of an automation system comprising several industrial devices, the method comprising:
    obtaining a device identifier for each of the industrial devices and indications of device ports and of device port connections between ports of each of the industrial devices;
    obtaining device Ethernet parameters for each respective industrial device;
    instantiating a system object model of the Ethernet configuration of the automation system based on the device identifiers, the device ports and device port connections and the Ethernet parameters;
    generating a graph model representative of the Ethernet configuration from the system object model by applying a set of predefined rules;
    applying cycle detection to the generated graph model by means of depth-first search;
    indicating a validation result based on the outcome of the cycle detection.

2. The method according to claim 1, wherein instantiating the system object model of the automation system comprises creating an instance of a generic Ethernet Object model for each respective industrial device based on the device identifiers, the device ports, device port connections and the device Ethernet parameters for each respective device.

3. The method according to claim 1, further comprising, if the validation result indicates an error in the Ethernet configuration, issuing an alert.

4. The method according to claim 1, wherein applying the predefined rule set comprises:
    creating a vertex for each device port;
    creating an edge for each device port connection;
    creating a vertex for each switching capability; and
    creating an edge between the switching capability vertex and the vertices of each device port switched by switching capability.

5. The method according to claim 4, wherein applying the predefined rule set further comprises:
    creating a vertex for each port of a routing capability; and
    creating directed edges for each configured route connecting the ports within the routing capability.

6. The method according to claim 4, wherein applying the predefined rule set further comprises:
    creating for each interface and for each endpoint associated with such interface respective vertices
    creating edges between the vertex of each interface and the vertices of each endpoint associated with that interface.

7. The method according to claim 6, wherein applying the predefined rule set further comprises:
    creating a vertex for a broadcast domain; and
    creating an edge connecting the broadcast domain vertex to each endpoint having an IP-address belonging to that broadcast domain.

8. The method according to claim 1, wherein the Ethernet parameters comprise IP addresses, broadcast domains and/or router configurations.

9. The method according to any of claim 2, wherein the generic Ethernet Object model comprises at least one of the following classes: an Ethernet class, a Switch Capability class, a Routing Capability class, a Ports class, an IP Range class, an End point class, an interface class, and/or a Broadcast domain class.

10. A non-transitory computer readable storage medium, with a computer program stored thereon, said computer program comprising instructions for, when executed by a processor, carrying out the method according to claim 1.

* * * * *